(12) United States Patent
Sudo et al.

(10) Patent No.: US 6,875,918 B2
(45) Date of Patent: Apr. 5, 2005

(54) JOINT FOR TUBULAR CABLE COVER

(75) Inventors: Hiroshi Sudo, Nagoya (JP); Nobuyoshi Tatoh, Nagoya (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/731,117

(22) Filed: Dec. 10, 2003

(65) Prior Publication Data

US 2004/0154817 A1 Aug. 12, 2004

(30) Foreign Application Priority Data

Dec. 11, 2002 (JP) ..................................... P2002-359830

(51) Int. Cl.[7] ................................................ H02G 3/04
(52) U.S. Cl. ...................... 174/49; 174/135; 174/65 R; 174/72 A; 138/108
(58) Field of Search ............................... 174/65 R, 135, 174/31 R, 68.1, 72 A, 72 R, 74 R, 74 A, 91, 73.1, 82, 94 R, 85, 100, 49, 65 G, 92; 248/68.1; 138/108, 109; 285/93, 94

(56) References Cited

U.S. PATENT DOCUMENTS

| | | | | |
|---|---|---|---|---|
| 3,711,632 A | * | 1/1973 | Ghirardi ..................... 174/135 |
| 4,573,715 A | * | 3/1986 | Armbruster ................... 285/94 |
| 4,719,321 A | * | 1/1988 | Kozel et al. ................. 174/135 |
| 5,046,766 A | * | 9/1991 | Lomberty et al. ............. 174/92 |
| 5,198,619 A | * | 3/1993 | Baker ........................ 174/74 A |
| 5,594,213 A | * | 1/1997 | Skopic ........................ 174/91 |
| 6,595,473 B2 | * | 7/2003 | Aoki et al. ................. 138/108 |
| 6,627,817 B1 | * | 9/2003 | Kortenbach ............... 174/74 R |
| 6,668,865 B2 | * | 12/2003 | Miyamoto et al. .......... 138/108 |

FOREIGN PATENT DOCUMENTS

| | | |
|---|---|---|
| JP | A 2002-25684 | 1/2002 |
| JP | A 2002-78137 | 3/2002 |

* cited by examiner

Primary Examiner—Dean A. Reichard
Assistant Examiner—Angel R. Estrada
(74) Attorney, Agent, or Firm—Oliff & Berridge, PLC

(57) ABSTRACT

A grip portion is formed by a pair of half-split grip portions and grips an end portion of a tubular cable cover exteriorly mounted on a cable when the half-split grip portions are joined. A clamp portion is formed by a pair of half-split clamp portions and clamps the cable exposed from the end portion when the half-split clamp portions are joined. A clamp protrusion is formed on an inner surface of the clamp portion and clamps the cable exposed from the end portion by pressing the cable in a radial direction.

11 Claims, 14 Drawing Sheets

JOINT FOR TUBULAR CABLE COVER

BACKGROUND OF THE INVENTION

1. Field of the Invention

The present invention relates to a joint for tubular cable cover that joints a tubular cable cover which covers a cable such as a wire harness, and more particularly to a joint which restricts a displacement of a tubular cable cover which covers the cable.

2. Description of the Related Art

Conventionally, cables which constitute a wire harness arranged inside of an engine room of a vehicle are covered by a cylindrical tubular cable cover such as a so-called corrugated tube or a so-called spiral tube in order to protect the cables from heat and dust and, at the same time, to prevent the cables from coming into contact with peripheral parts.

For example, the corrugated tube is formed by molding using a synthetic resin material such as polypropylene which has an excellent shock resistance characteristic and an excellent wear resistance characteristic. The corrugated tube is formed in a thin cylindrical shape, has the bellow structure in which annular grooves and annular projections which extend in the circumferential direction are arranged at an equal pitch in the tube length direction, and has a favorable flexibility characteristic. A bundle of cables are placed inside the corrugated tube to thereby protect the cables. As the corrugated tube, there are types provided with a longitudinally extending slit and types not provided with such a longitudinally extending slit. The corrugated tube having the slit has been popularly used since it is capable of easily placing the cables therein.

In FIG. 19, there is shown a wire harness W which includes: a trunk line Wa which bundles a plurality of cables Wd; a branch line Wb which is branched from a branch portion Wc of the trunk line Wa; and a connector C which is mounted on a distal end portion of the branch line Wb for connection with electric equipments or various sensors. As shown in FIG. 19, three corrugated tubes T are exteriorly mounted on a portion between the connector C and the branch portion Wc and other portions for protecting the trunk line Wa and the branch line Wb.

Usually, in such a wire harness W, a length of the cable Wd and a length of the corrugated tube T which is exteriorly mounted on the cable Wd are manufactured under a strict length control. Particularly, lengths of the cables which are exposed from end portions of the corrugated tubes T (A, B in FIG. 19) are controlled such that a displacement of the corrugated tube T with respect to the cables is prevented.

However, at the time of actually wiring the cables in a vehicle or the like, the distance A between a rear end face of the connector C and an end face of the tube T and the distance B between end faces of the tubes T in the branch portion Wc are changed. In such a state, there exists a drawback that a displacement of the corrugated tube T with respect to the cables Wd is allowed. When the displacement of the corrugated tube T with respect to the cables Wd is allowed, due to the operation of an engine and other acoustic wave vibration, the wire harness W is resonated thus giving rise to a connection failure of terminals inside the connector C and, in a worst case, the disconnection of electric lines.

Therefore, conventionally, as shown in FIG. 20, at both end portions of the exteriorly mounted corrugated tube T, to restrict the generation of the displacement of the corrugated tube T with respect to an external force such as vibration, a tacky adhesive tape 21 is wound around the cable Wd which is exposed from the end portion of the tube T so as to fix the corrugated tube T (see JP-A-2002-078137). Further, as shown in FIG. 21, there has been also known a method in which a member 22 which makes a corrugated tube T and a connector C engage each other is separately provided so as to fix an end portion of the corrugated tube T to the connector C (see JP-A-2002-025684).

However, the restriction of the displacement of the corrugated tube T by the tape winding shown in FIG. 20 has a drawback that when the tacky adhesive tape 21 is used under an environment such as an engine room which is under a high temperature and a high humidity and is subjected to a considerable vibration for a long period (e.g. for 10 years), the tacky adhesive tape 21 is peeled off and the peeled-off tape 21 is entangled to a belt or the like. Further, since such a tape winding operation is cumbersome, the operation efficiency is poor thus making the reduction of the manufacturing cost of the wire harness difficult. Still further, since fixing by tape winding is weak, there exists a possibility that the displacement of the corrugated tube T is allowed.

Further, although the restriction of the displacement of the corrugated tube T using the engaging member 22 shown in FIG. 21 does not cause such a drawback attributed to tape winding, the provision of the engaging member 22 leads to the increase of a volume of the connector C. Such a volume increase of the connector C is not favorable in view of wiring of cables in the inside of the vehicle where the space efficiency is important. Further, assembling of the wire harness in a narrow space such as the inside of the engine room is deteriorated.

SUMMARY OF THE INVENTION

It is therefore an object of the invention to provide a joint for tubular cable cover having the miniaturized and simple structure which can restrict a displacement of a tubular cable cover exteriorly mounted on cables.

In order to achieve the object, according to one aspect of the invention, there is provided a joint for a tubular cable cover including: a grip portion formed by a pair of half-split grip portions and configured to grip an end portion of the tubular cable cover exteriorly mounted on a cable by joining the pair of half-split grip portions; a clamp portion formed by a pair of half-split clamp portions and configured to clamp the cable exposed from the end portion by joining the pair of half-split clamp portions; and a clamp protrusion formed on an inner surface of the clamp portion and configured to clamp the cable exposed from the end portion by pressing the cable in a radial direction.

According to the joint having the above-mentioned structure, by adopting the conventionally-unknown or novel structure that the joint includes the grip portion which grips the end portion of the tubular cable cover such as a corrugated tube and the clamp portion which clamps the cable exposed from the end portion of the tubular cable cover, it is possible to readily restrict a displacement of the tubular cable cover by easily fixing the tubular cable cover to the cable. Further, by adopting the structure in which the grip portion and the clamp portion are formed by closing and joining halves which are half-split in the direction that the tubular cable cover is clamped, the grip portion and the clamp portion can be easily mounted on the end portion of the tubular cable cover thus enhancing the operability.

Further, the present invention adopts the structure in which the cables are clamped such that clamping members which clamp the cable exposed from the end portion of the tubular cable cover by pressing the cable in the radial direction at the time of closing and joining the respective halves are formed inside the respective halves of the clamp portion in a projecting manner. Accordingly, at the time of mounting the coupling to the end portion of the tubular cable cover, the tubular cable cover can be easily fixed to a given position of the cables with high accuracy. Accordingly, with the use of the coupling of the present invention, the control of the tolerance with respect to a length of the cables and a length of the tubular cable cover is facilitated and hence, it is possible to constitute the wire harness substantially in accordance with the design. Further, due to such a simple structure, it is possible to provide the miniaturized coupling which can be manufactured at a low cost.

In this case, by adopting the structure in which respective halves of the grip portion and/or the clamp portion are connected to each other with a hinge portion such that the respective halves can be opened and closed, the closing and the joining are facilitated and hence, the mounting operability is enhanced. Further, by adopting the structure in which an adhesive agent is filled in portions of the clamp portion which clamp the cable, clamping of the cables by the clamp portion is strengthened and hence, the displacement of the tubes can be restricted more reliably. Still further, by adopting the structure in which clamping of the cables by the clamp portion is performed by way of a resilient body, the deformation of the cable cross section due to clamping can be suppressed and, at the same time, the clamping force can be enhanced.

BRIEF DESCRIPTION OF THE DRAWINGS

The objects and advantages of the present invention will become more apparent by describing preferred embodiments thereof in detail with reference to the accompanying drawings, wherein.

DETAILED DESCRIPTION OF THE PREFERRED EMBODIMENTS

Referring now to the accompanying drawings, a description will be given in detail of preferred embodiments of the invention.

Figure 1:
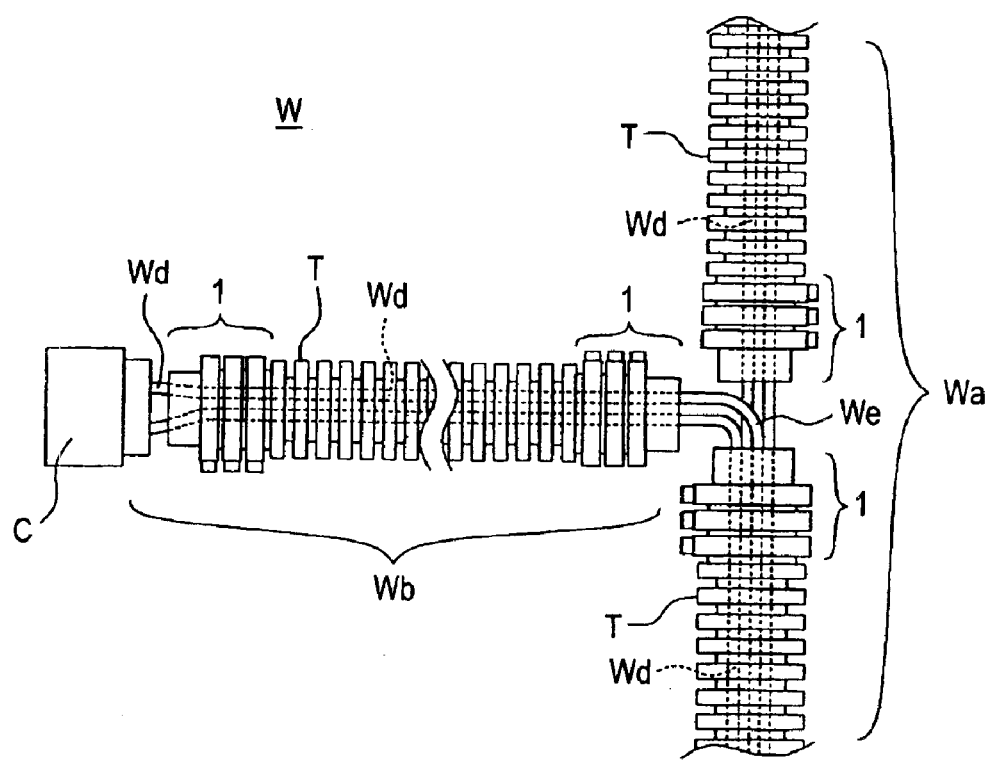
FIG. 1 shows a schematic structure of a wire harness in which a joint 1 according to the first embodiment of the present invention is used.
Figure 2:
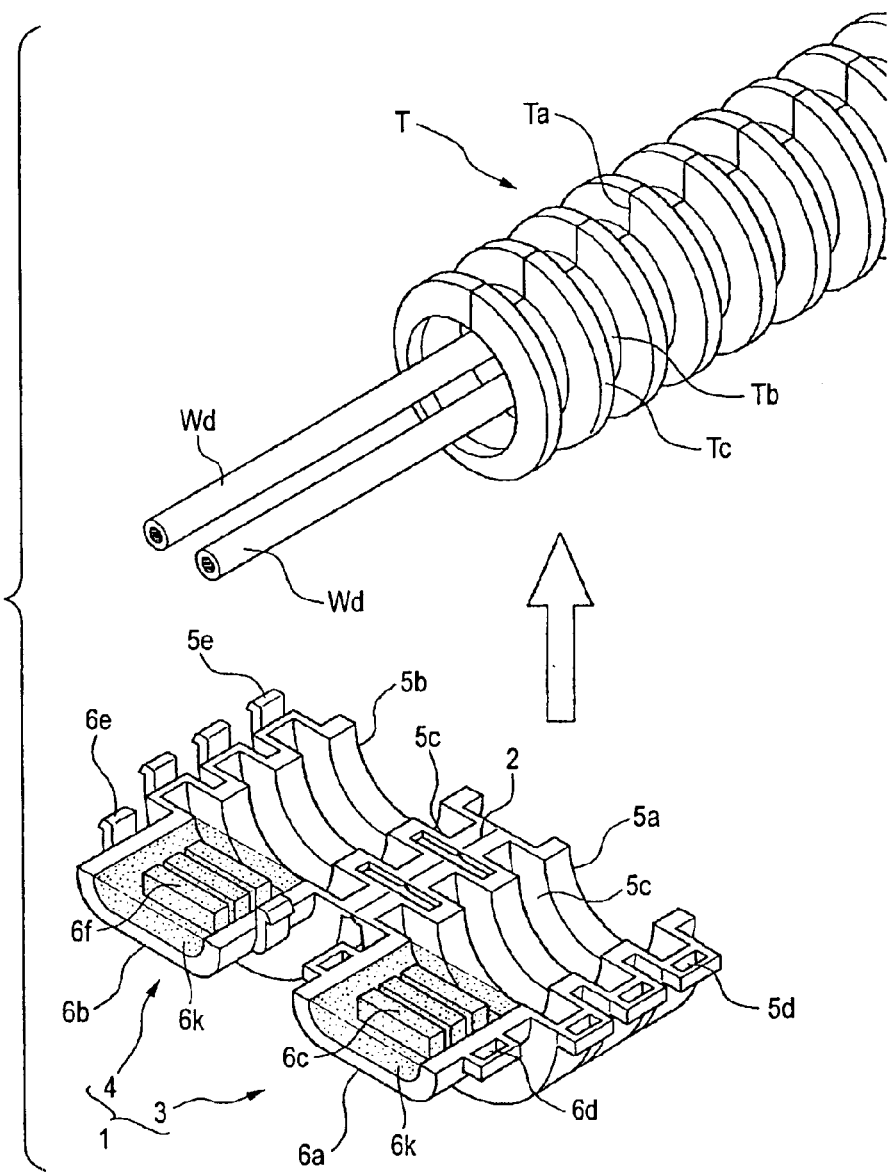
FIG. 2 is an appearance perspective view of the joint 1 showing a state before the joint 1 is mounted on a tubular cable cover T.
Figure 3:
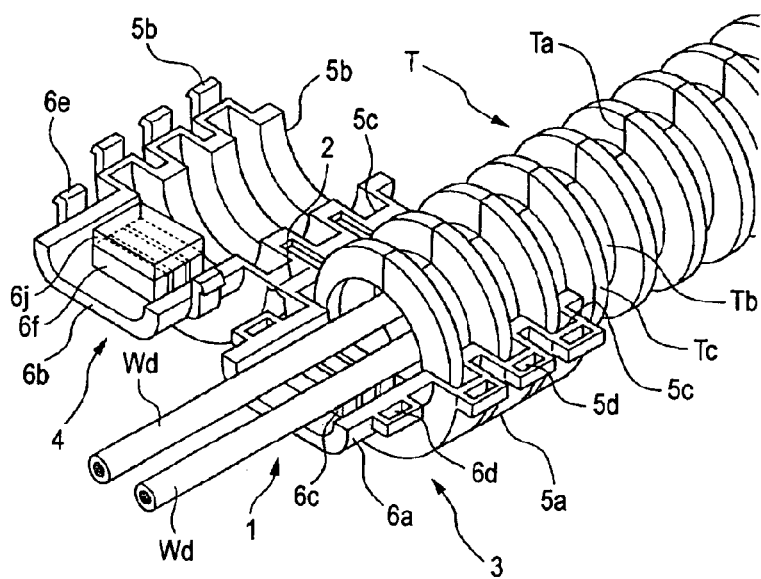
FIG. 3 is a view showing a step for mounting the joint 1 on an end portion of the tubular cable cover T.
Figure 4:
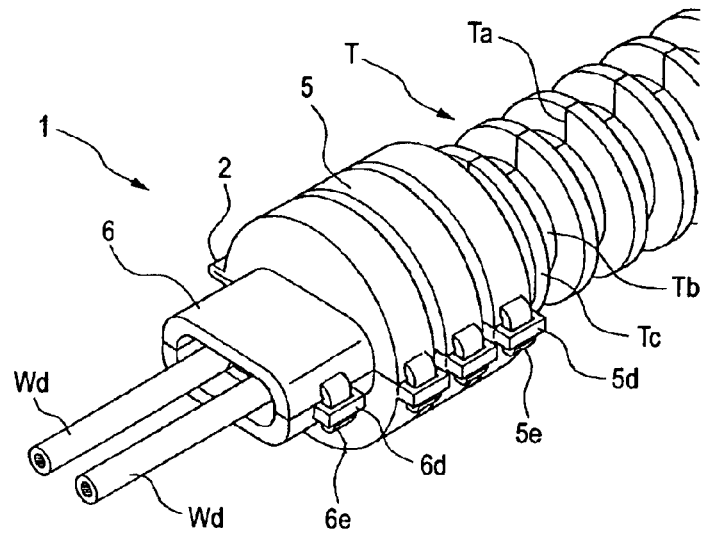
FIG. 4 is an appearance perspective view of the joint 1 showing a state after the joint 1 is mounted on the end portion of the tubular cable cover T.
Figure 14A:
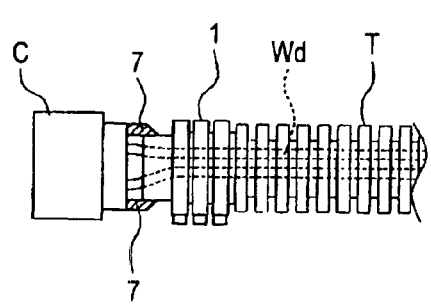
FIGS. 14A and 14B are views showing various configurations of the joint 1.
Figure 14B:
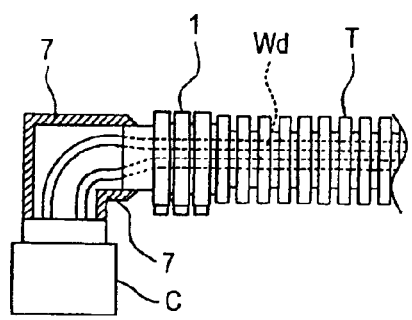
Figure 15:
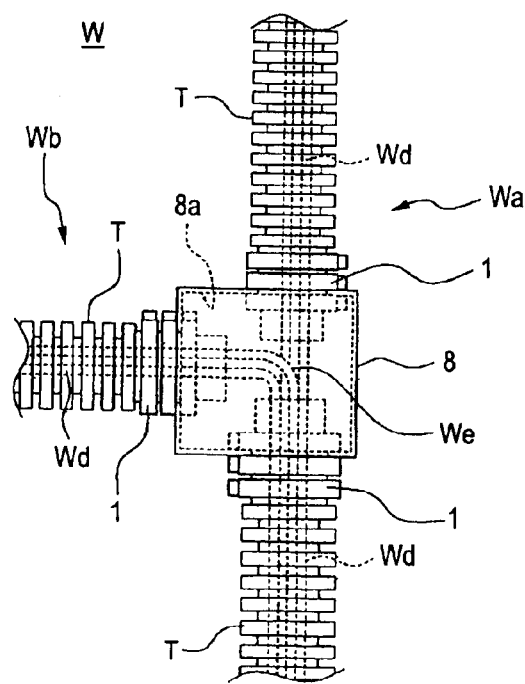
FIG. 15 is a view showing another configuration of the joint 1.

A first embodiment is explained referring to FIGS. 1 through 15. FIG. 1 is a view showing the schematic structure of a wire harness W in which the joint 1 according to the first embodiment is mounted, FIGS. 2 through 4 are views showing steps for mounting the joint 1 to an end portion of a corrugated tube T, FIGS. 5 through 13 are views showing three modifications of the joint 1 for respective mounting steps, and FIGS. 14 and 15 are views showing modes of utilization of the joint 1.

The wire harness W includes a trunk line Wa which bundles a plurality of cables Wd and extends longitudinally in the drawing and a branch line Wb which is formed by branching a portion of the cables Wd which constitute the trunk line Wa and extends laterally in the drawing. A connector C is connected to a distal end of the branch line Wb branched from the trunk line Wa. Three corrugated tubes T are exteriorly mounted on the trunk line Wa and the branch line Wb respectively.

The corrugated tube T is a hollow tube having bellows and is formed by molding using flame-resistant polypropylene as a material. The corrugated tube T is served for protecting the cables in addition to binding and bundling of the cables and is freely bendable by bending an axis thereof.

A slit (a cut) Ta which extends in the longitudinal direction is formed in each corrugated tube T over the whole length. When the corrugated tubes T are exteriorly mounted on the trunk line Wa and the branch line Wb, the slits Ta are opened and the trunk line Wa and the branch line Wb are housed in the inside of the corrugated tubes T through the slits Ta. As shown in FIG. 1, on end portions of three corrugated tubes T which are exteriorly mounted on the trunk line Wa and the branch line Wb, the joint for tubular cable covers 1 according to the present invention are mounted and a displacement in the axial direction of the corrugated tubes T with respect to the trunk line Wa and the branch line Wb is restricted by the joint 1.

The joint 1 shown in FIGS. 2 through 4 is formed in a hollow shape by molding using a synthetic resin material. The joint 1 is mounted on the end portion of the corrugated tube T by closing and joining half-split members 3, 4 which are connected by hinges 2. The joint 1 before mounting is usually in a state that the half-split members 3, 4 are opened. Each of the half-split member 3 and 4 respectively includes a pair of half-split grip portions 5a, 5b and a pair of half-split clamp portions 6a, 6b, wherein the half-split grip portions 5a, 5b are connected to each other by three hinges 2 which are extended coplanar with a separation surface.

An inner diameter of the half-split grip portions 5a, 5b which are fitted on the end portion of the corrugated tube T from the outside is substantially equal to an outer diameter of the corrugated tube T. Further, projecting portions 5c which extend in the circumferential direction are formed on inner peripheries of the half-split grip portions 5a, 5b in three rows in the axial direction, wherein the projecting portions 5c are configured to be fitted in or fitted on annular grooves Tb and annular projections Tc which are formed on an outer periphery of the corrugated tube T without displacement.

Engaging holes 5d are formed in an outer periphery in the vicinity of a mating face of one half-split grip portion 5a, while engaging protrusions 5e are formed on an outer periphery in the vicinity of a mating face of another half-split grip portion 5b. When both half-split grip portions 5a, 5b are closed and joined to each other, these engaging holes 5d and the engaging protrusions 5e engage with each other so as to maintain the joined state of both half-split grip portions 5a, 5b.

The half-split clamp portions 6a, 6b which are contiguously and integrally formed with respective end portions of these half-split grip portions 5a, 5b are served for clamping the cables Wd exposed from the end portion of the corrugated tube T. In this case, the half-split clamp portions 6a, 6b have a semi-elliptical shape which has diameters smaller than diameters of the half-split grip portions 5a, 5b.

On an inner periphery of these half-split clamp portions 6a, 6b, clamp protrusions 6c, 6f are formed in a projecting manner in three rows in the axial direction with a height lower than mating faces. Since these clamp protrusions 6c, 6f are formed such that an interval between the clamp protrusions 6c, 6f which face each other is set smaller than an outer diameter of the cable Wd in a state that the half-split clamp portions 6a, 6b are joined to each other, the cables Wd are pressed in the radial direction and are clamped by the clamp protrusions 6c, 6f which face each other.

With respect to these half-split clamp portions 6a, 6b, an engaging hole 6d is formed in an outer periphery of the vicinity of the mating face of one half-split clamp portion 6a and an engaging protrusions 6e is formed in an outer periphery of the vicinity of the mating face of another half-split clamp portion 6b. By making the engaging hole 6d and the engaging protrusions 6e engage with each other when both half-split clamp portions 6a, 6b are joined, both half-split clamp portions 6a, 6b are held in a joined state in a state that the cables Wd are clamped between the clamp protrusions 6c, 6f which face each other in an opposed manner.

Due to joining of the half-split grip portions 5a, 5b and joining of the half-split clamp portion 6a, 6b as shown in FIG. 4, the joined half-split grip portions 5a, 5b constitute a grip portion 5 which grips the end portion of the corrugated tube T and, at the same time, the joined half-split clamp portions 6a, 6b constitute a clamp portion 6 which clamps the cables Wd which are exposed from the end portion of the corrugated tube T.

Hereinafter, the mounting the joint 1 having the structure described above to the end portion of the corrugated tube T will be explained. To mount the joint 1 to the end portion of the corrugated tube T which is preliminarily exteriorly mounted on the cables Wd of the trunk line Wa or the branch line Wb of the wire harness W, first of all, one half-split member 3 of the joint 1 which is in an opened state is set.

As shown in FIG. 3, the end portion of the corrugated tube T is placed on the half-split grip portion 5a and the annular grooves Tb and the annular projections Tc formed on the outer periphery of the corrugated tube T are fitted on the projecting portions 5c and, at the same time, two cables Wd are placed on the clamp protrusions 6c of the half-split clamp portions 6a.

Then, the half-split member 4 is turned in a reverse direction about the hinges 2 to make the half-split member 4 join with the half-split member 3 in which the end portion of the corrugated tube T and two cables Wd exposed from the end portion are set such that the half-split member 4 covers the half-split member 3 from above. Thereafter, by respectively making the engaging holes 5d and the engaging protrusions 5e of the grip portion 5 engage with each other and the engaging hole 6d and the engaging protrusions 6e of the clamp portion 6 engage with each other, the half-split members 3, 4 are locked in the joined state.

Due to such a joining operation, the end portion of the corrugated tube T is gripped inside the grip portion 5 of the joint 1 in a state that an outer periphery of the end portion of the corrugated tube T is covered with the grip portion 5 and, at the same time, due to the clamp protrusions 6c, 6f which are provided inside the clamp portion 6 in an opposed manner, two cables Wd which are exposed from the end portion of the corrugated tube T are pressed in the radial direction and are clamped in a state that outer peripheries of two cables Wd are covered with the clamp portions 6 whereby the mounting of the joint 1 is completed.

By mounting the joint 1 having such a structure, the end portion of the corrugated tube T and the cable Wd exposed from the end portion are fixed to each other by the joint 1 and hence, the corrugated tube T is prevented from displacing during wiring of the wire harness W in a vehicle or the like. Further, after wiring the wire harness W, a displacement of the corrugated tube T with respect to the cables Wd which is generated by an external force such as vibration can be prevented and hence, a drawback attributed to the resonance or the like can be eliminated.

Further, the joint 1 is constituted of two half-split members 3, 4 and hence, mounting of the joint 1 to the end portion of the corrugated tube T is facilitated thus enhancing the operability. Further, the joint 1 can be miniaturized. Still further, at the time of mounting the joint 1, the mounting of the joint 1 such that an end face of the corrugated tube T is located at a desired position of the cables Wd can be performed with high accuracy and hence, the size control of a length of the cables and a length of the corrugated tube is facilitated.

By filling an adhesive agent 6k in a portion of the clamp portion 6 which clamps the cables, the portion which is sandwiched by the clamp protrusions 6c, 6f in the embodiment, clamping of the cables Wd by the clamp protrusions 6c, 6f can be further strengthened due to curing of the adhesive agent 6k, whereby fixing of the corrugated tube T to the cables Wd is enhanced. Further, by adopting the structure that clamping of the cables Wd by the clamp portion 6 is performed in a state that a resilient member 6j is disposed between the cables Wd and the clamp portion 6, that is, by adopting the structure in which a sheet-like member made of a resilient material such as rubber, sponge or the like, for example, is preliminarily wrapped around the cable Wd and the wrapped portion is clamped by the clamp protrusions 6c, 6f of the clamp portion 6 or the above-mentioned sheet is laminated to the clamp protrusions 6c, 6f and the cables Wd are clamped by the clamp protrusions 6c, 6f, the deformation of the cross section of the cables Wd attributed to pressing of the clamp protrusions 6c, 6f can be alleviated and at the same time, a clamping force can be increased whereby fixing of the corrugated tube T to the cables Wd is enhanced.

Hereinafter, three modifications of such a joint 1 are explained with reference to FIGS. 5 through 13. Here, structures which are identical with the structures of the above-mentioned embodiment are given same symbols and their explanation is omitted. That is, the modifications are explained while focusing on points which make the modifications different from the above-mentioned embodiment.

Figure 5:
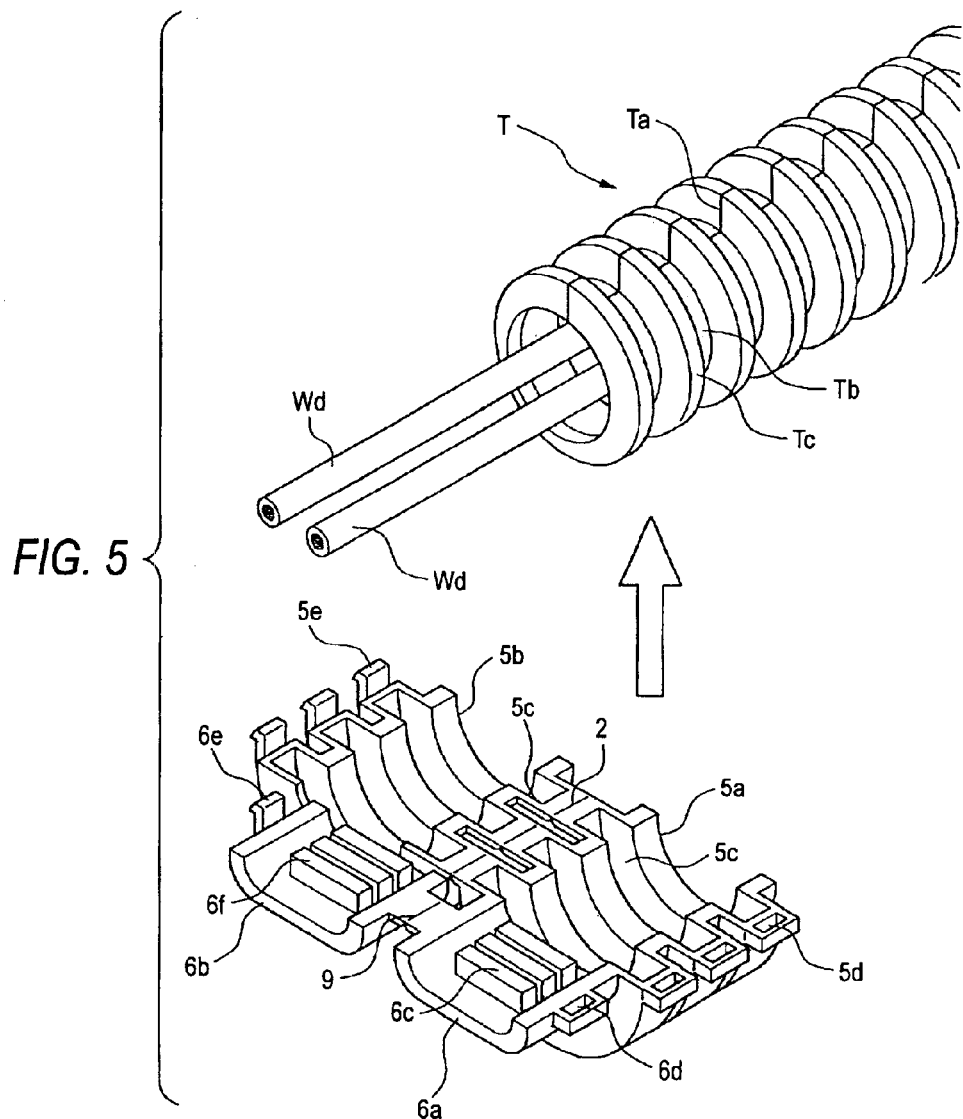
FIG. 5 is an appearance perspective view of the joint 1 showing a state before the joint 1 is mounted on a tubular cable cover T in a first modification.
Figure 6:
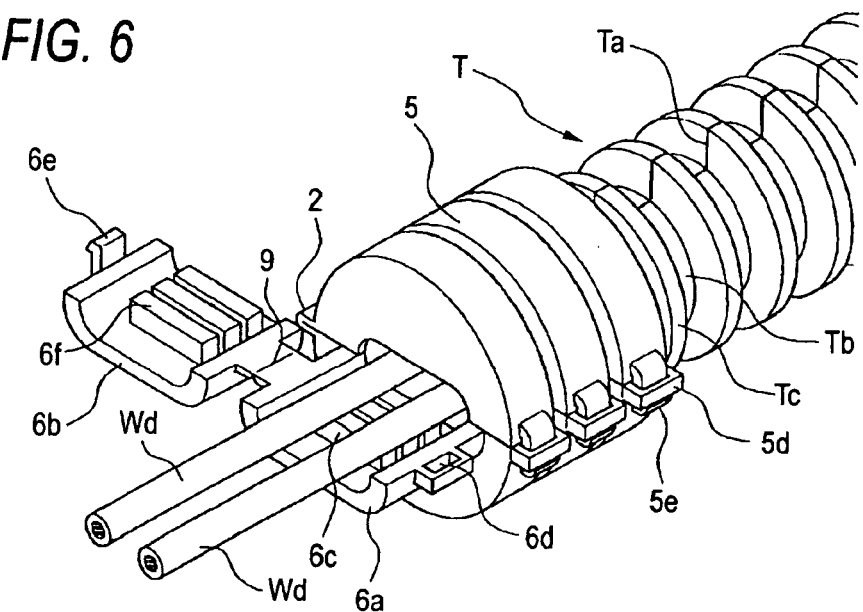
FIG. 6 is a view showing a step for mounting the joint 1 on an end portion of the tubular cable cover T in the first modification.
Figure 7:
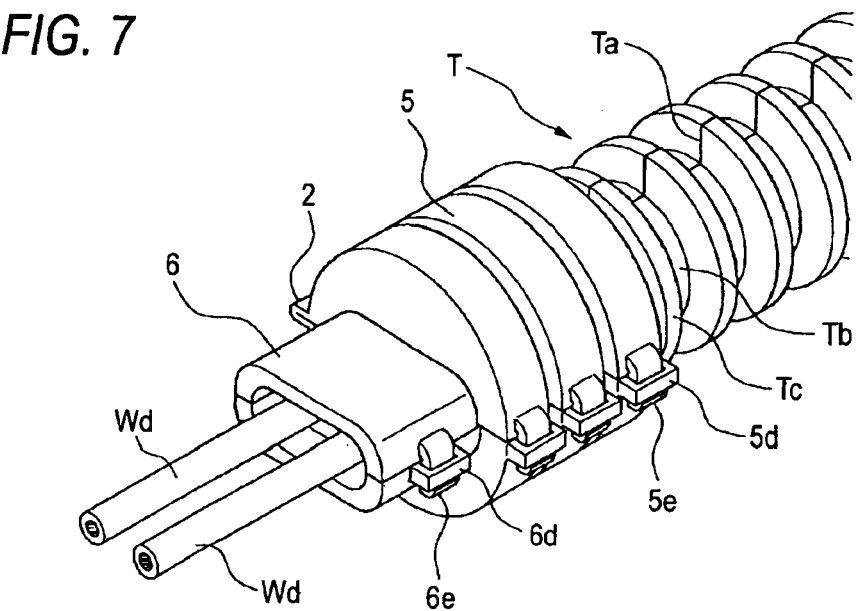
FIG. 7 is an appearance perspective view of the joint 1 showing a state after the joint 1 is mounted on the end portion of the tubular cable cover T in the first modification.

The first modification shown in FIGS. 5 through 7 is characterized by the structure in which the half-split clamp portion 6b is separated from the half-split grip portion 5b as an independent body and, at the same time, the half-split clamp portion 6b is connected to the half-split clamp portion 6a by way of a hinge 9. By adopting such a structure in which joining of the half-split clamp portions 6a, 6b and joining of the half-split grip portions 5a, 5b are performed separately, it is possible to make the clamp portion 6 clamp the cables Wd at a desired position after making the grip portion 5 of the joint 1 grip a terminal portion of the corrugated tube T. Accordingly, for example, when it is necessary to retry positioning after failure, it is sufficient to release only the joined state of the clamp portion 6 and hence, the operation is facilitated.

Figure 8:
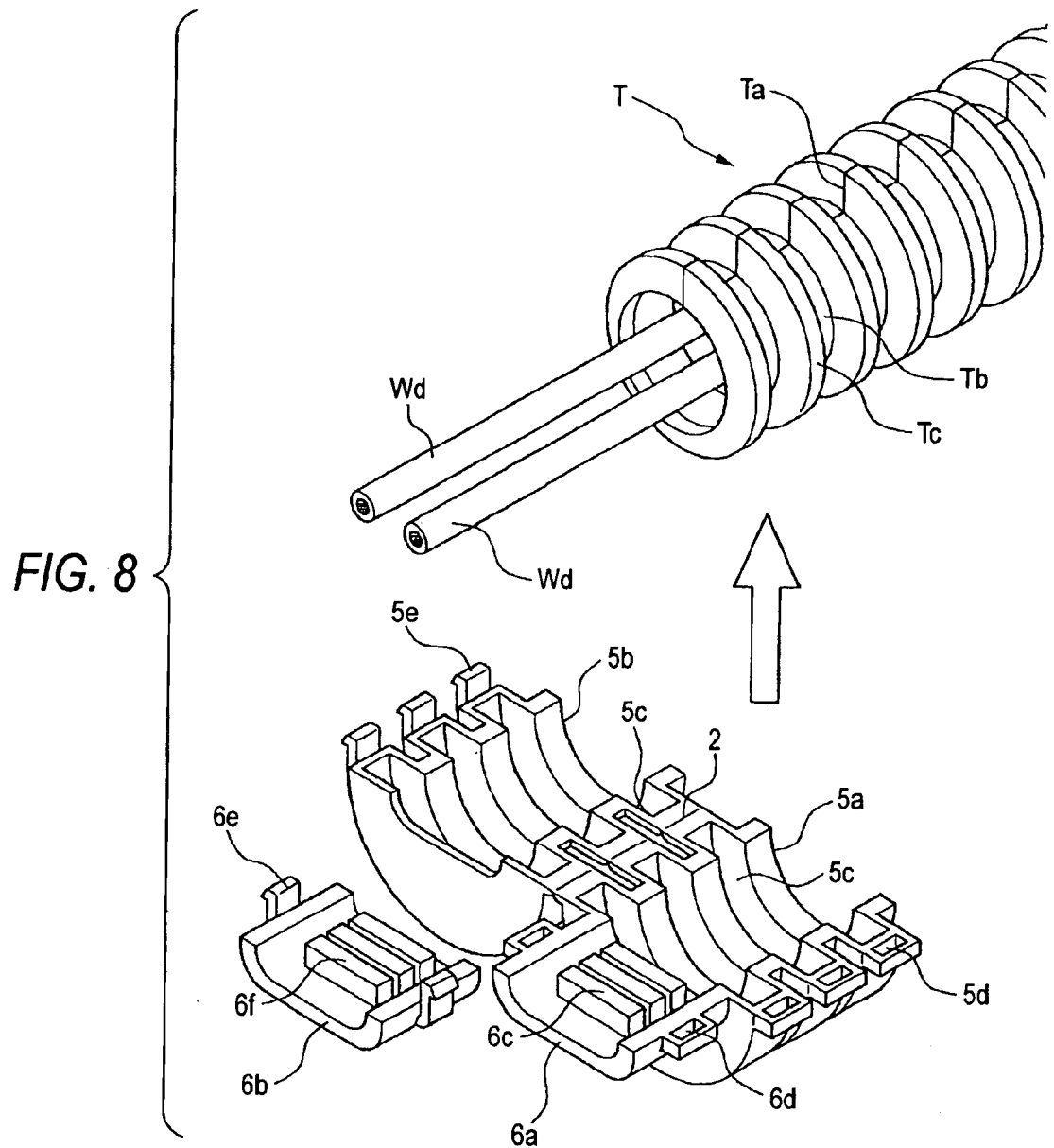
FIG. 8 is an appearance perspective view of the joint 1 showing a state before the joint 1 is mounted on a tubular cable cover T in a second modification.
Figure 9:
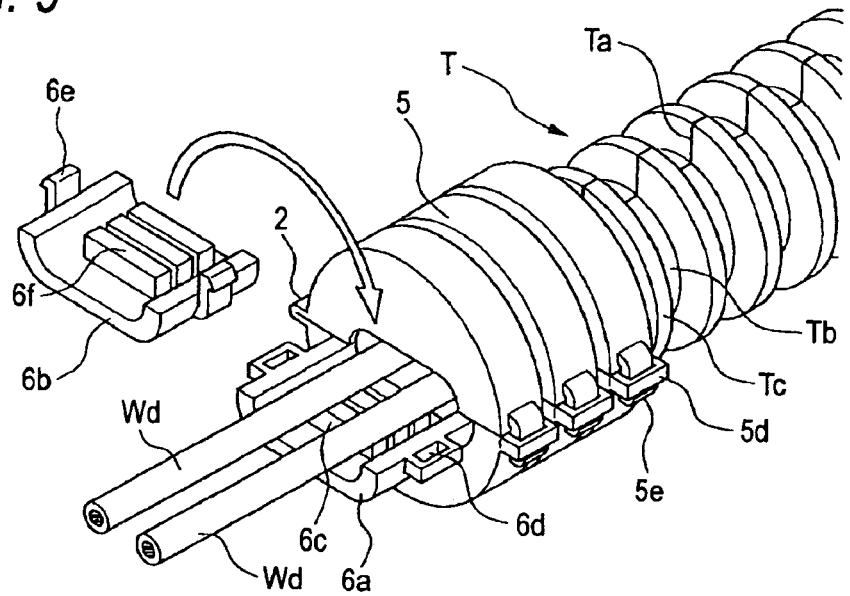
FIG. 9 is a view showing a step for mounting the joint 1 on an end portion of the tubular cable cover T in the second modification.
Figure 10:
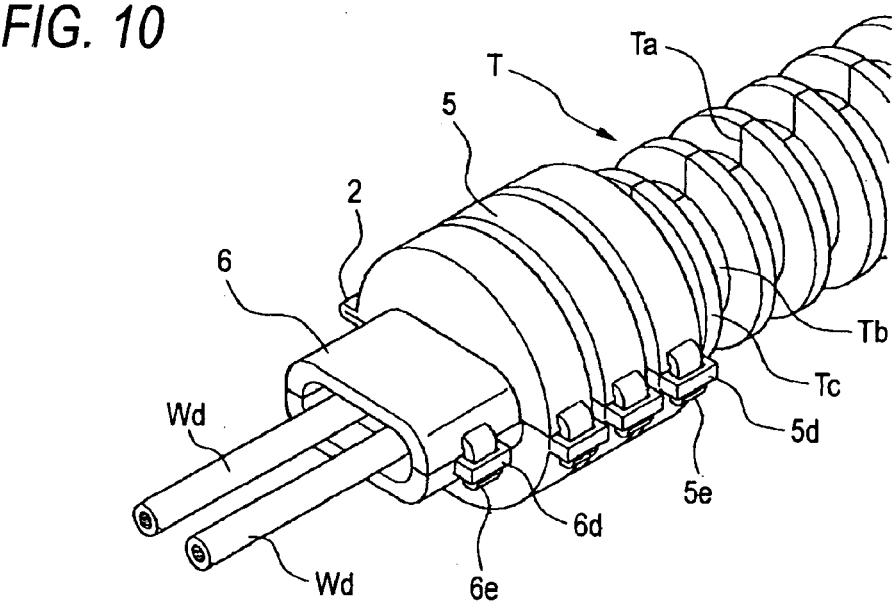
FIG. 10 is an appearance perspective view of the joint 1 showing a state after the joint 1 is mounted on the end portion of the tubular cable cover T in the second modification.

The second modification shown in FIGS. 8 through 10 is characterized by the structure in which the half-split clamp portion 6b is separated from the half-split grip portion 5b as an independent body. With a provision of such a structure, it is also possible to have an advantageous effect similar to the advantageous effect of the above-mentioned first modification. Further, according to this modification, by providing a plural types of half-split clamp portions 6b corresponding to various types of cables which differ in diameter, it is possible to cope with various types of cables by merely exchanging the half-split clamp portions 6b. Accordingly, the increase of types of the joint for tubular cable covers can be prevented and hence, a cost for control of parts can be suppressed.

Figure 11:
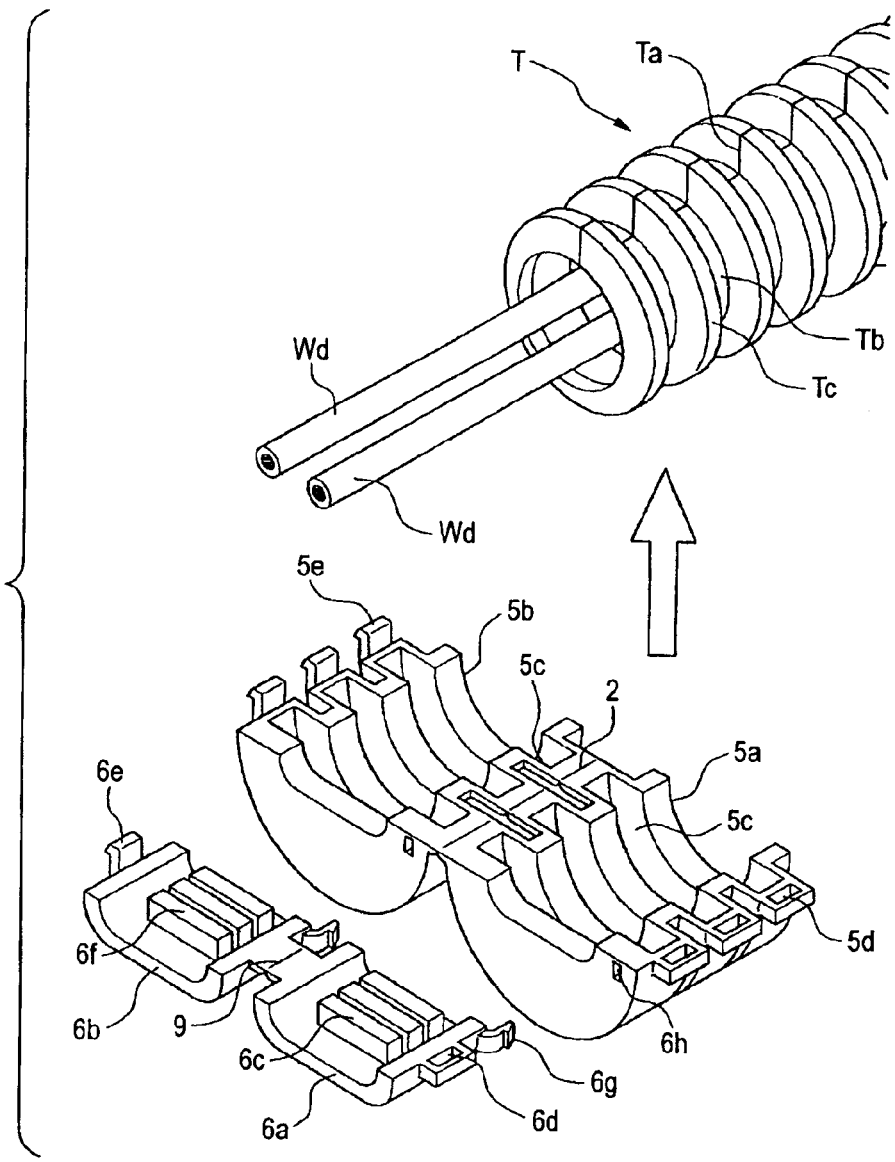
FIG. 11 is an appearance perspective view of the joint 1 showing a state before the joint 1 is mounted on a tubular cable cover T in a third modification.
Figure 12:
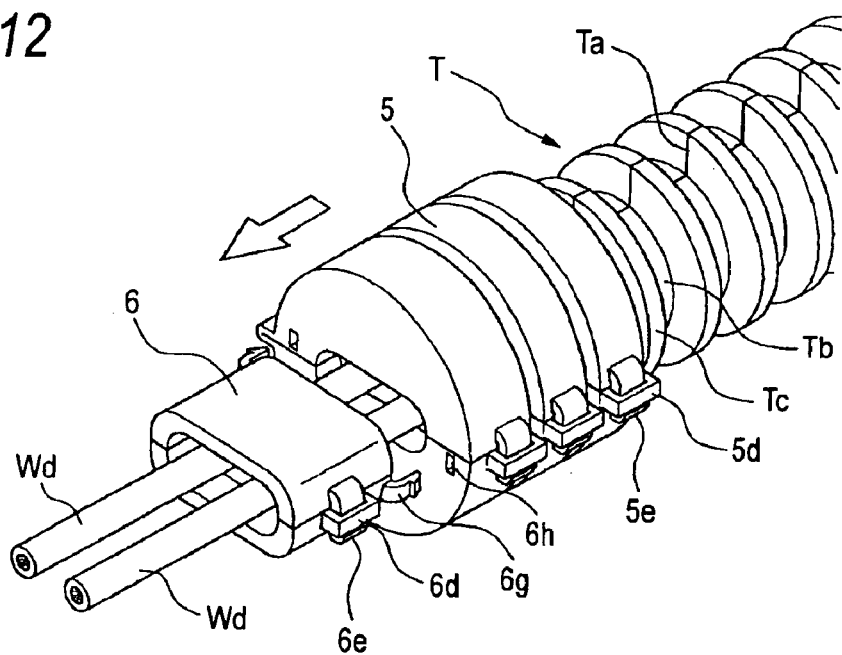
FIG. 12 is a view showing a step for mounting the joint 1 on an end portion of the tubular cable cover T in the third modification.
Figure 13:
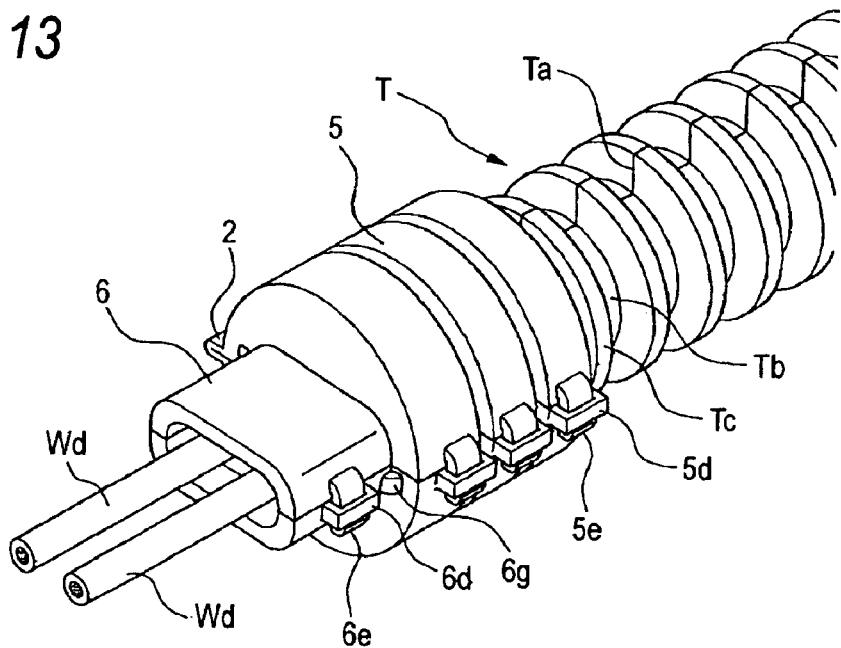
FIG. 13 is an appearance perspective view of the joint 1 showing a state after the joint 1 is mounted on the end portion of the tubular cable cover T in the third modification.

The third modification shown in FIGS. 11 through 13 is characterized by the structure in which the half-split clamp portions 6a, 6b which are connected by way of hinges 9 are separated from the half-split grip portions 5a, 5b as independent bodies. In this case, engaging pawls 6g, 6g are formed on rear ends of the half-split clamp portions 6a, 6b and, at the same time, engaging holes 6h, 6h which engage with the engaging pawls 6g, 6g are formed in front end faces of the half-split grip portions 5a, 5b. By making the engaging pawls 6g and the engaging holes 6h engage with each other, the clamp portion 6 and the grip portion 5 are held in the joined state. Due to such a structure, an operation to make the grip portion 5 of the joint 1 grip the terminal portion of the corrugated tube T and an operation to make the clamp portion 6 clamp the cables Wd at a given position can be performed separately and hence, the mounting operation of the joint 1 is facilitated.

As a configuration for further enhancing fixing of the corrugated tube T using the joint 1 explained above, there are configurations shown in FIGS. 14A, 14B and 15. FIGS. 14A and 14B shows a configuration in which the joint 1 and the connector C are connected to each other at a connection portion 7. FIG. 14A shows a configuration in which the connector C is linearly connected to the joint 1 and FIG. 14B shows a configuration in which the connector C is connected to the joint 1 in an L shape. By connecting the connector C and the joint 1 at the connection portion 7 in this manner, fixing of the corrugated tube T is enhanced. In this case, by adopting the structure in which the connection portion 7 covers the exposed cables Wd, the exposed portion can be also protected.

As the structure which provides the connection portion 7, it may be possible to adopt any one of: (a) a structure in which the connection portion 7 is integrally formed on a rear end portion of the connector C and a distal end of the connection portion 7 is connected to a given portion of the joint 1 by engagement; (b) a structure in which the connection portion 7 is integrally formed with the joint 1 and a distal end of the connection portion 7 is connected to a rear end portion of the connector C by engagement; and (c) a structure in which the connection portion 7 is prepared as a separate member and is respectively engaged with the connector C and the joint 1 by engagement.

FIG. 15 shows another configuration in which the joint for tubular cable covers 1 which are mounted on the end portions of the corrugated tubes T at the branch portion We of the wire harness W are respectively connected to wall faces 8a of a casing-like protector 8 which is prepared separately by fitting. With the use of such a protector 8, fixing of the corrugated tubes T at the branch portion We is further enhanced, at the same time, exposed portions of the cables Wd can be also protected in the branch portion We.

Figure 16:
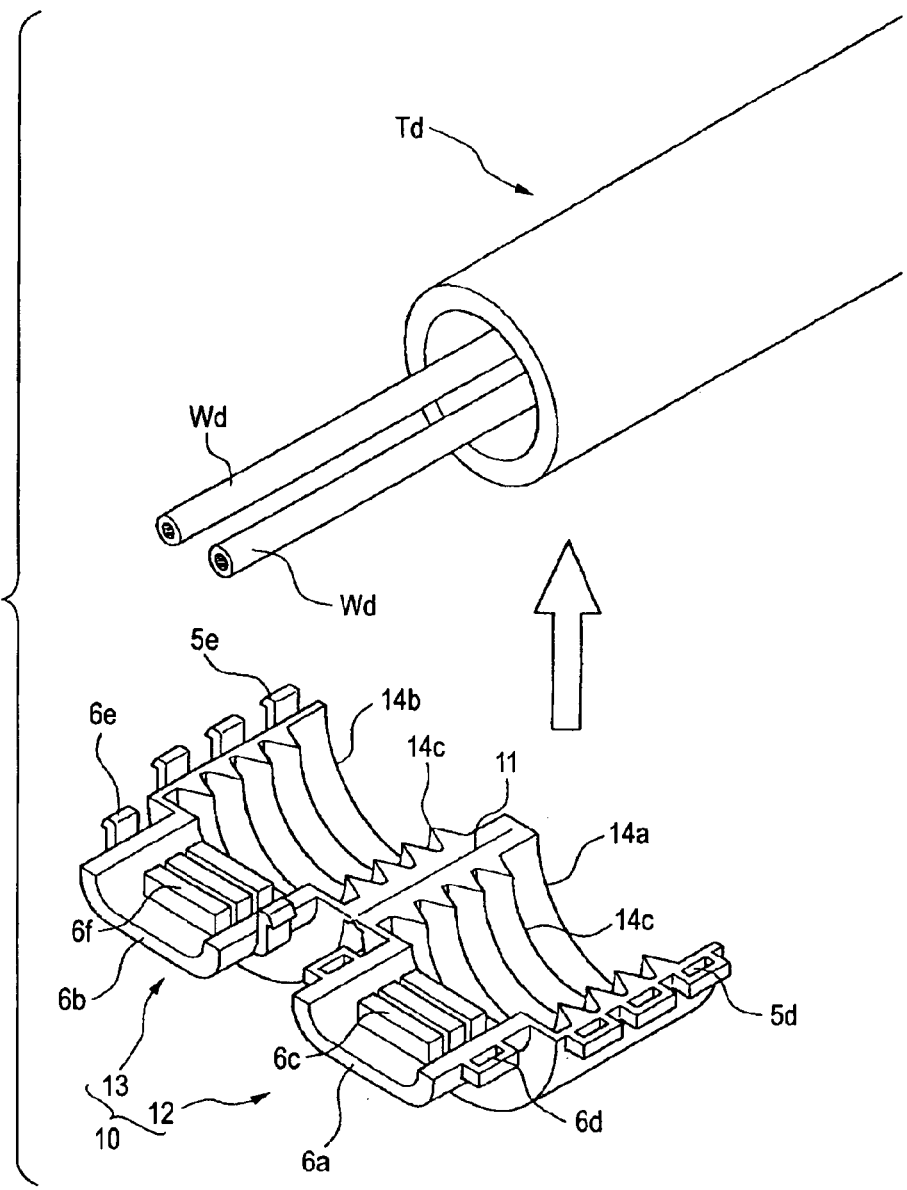
FIG. 16 is an appearance perspective view of the joint 10 showing a state before the joint 10 is mounted on a tubular cable cover Td in the second embodiment of the present invention.
Figure 17:
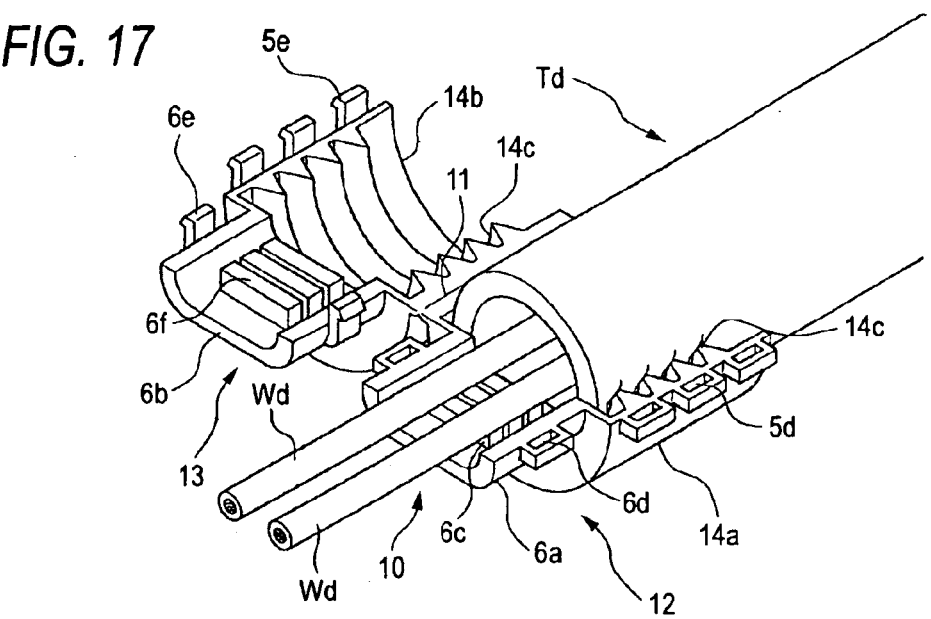
FIG. 17 is a view showing a step for mounting the joint 10 on an end portion of the tubular cable cover Td in the second embodiment.
Figure 18:
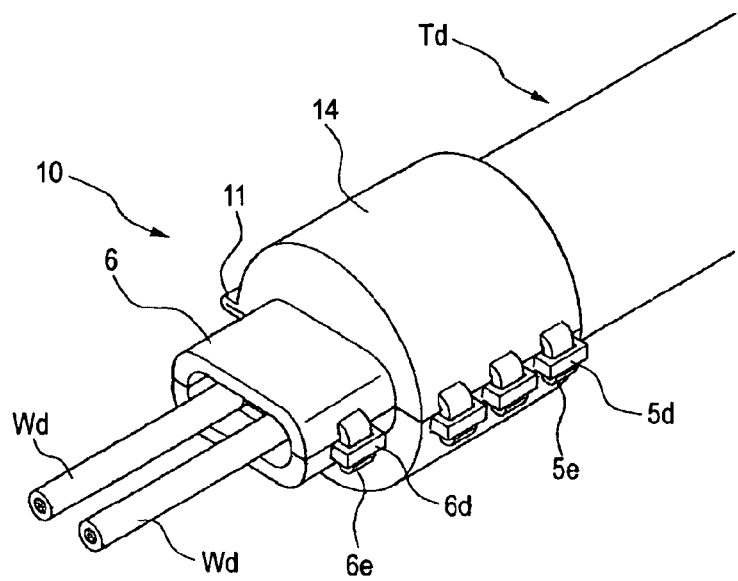
FIG. 18 is an appearance perspective view of the joint 10 showing a state after the joint 10 is mounted on the end portion of the tubular cable cover Td in the second embodiment.
Figure 19:
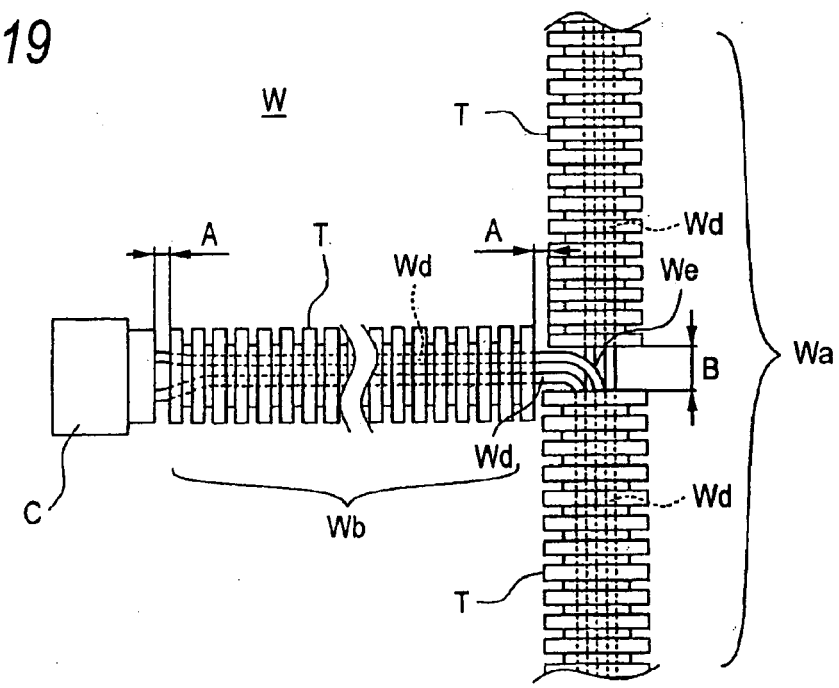
FIG. 19 is a view showing the schematic structure of a wire harness W on which a conventionally available tubular cable cover T is exteriorly mounted.
Figure 20:
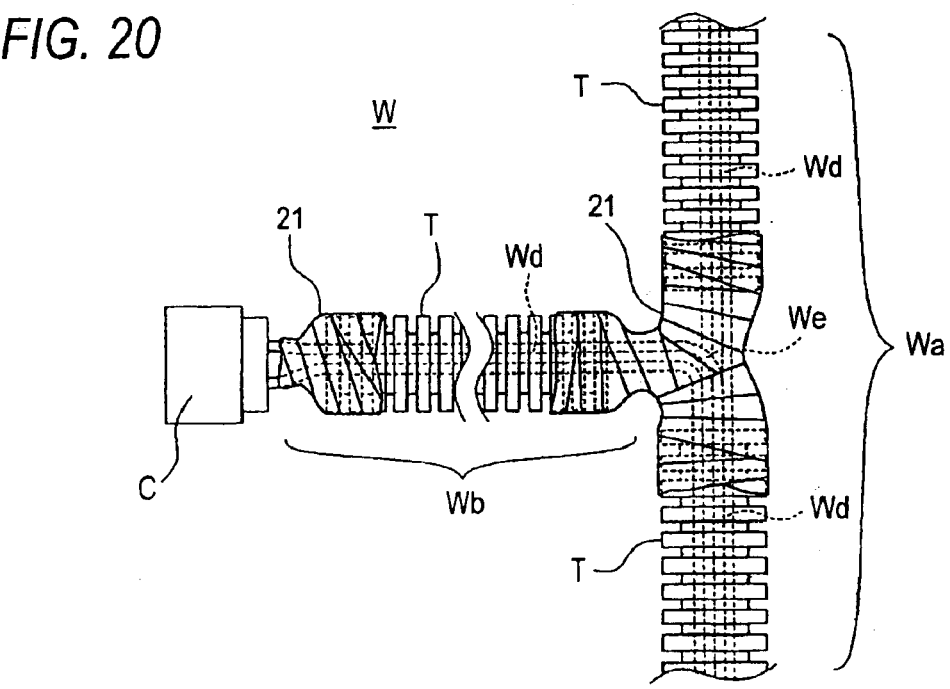
FIG. 20 is a view showing the schematic structure for restricting a displacement of a tubular cable cover T using conventionally available tape winding.
Figure 21:
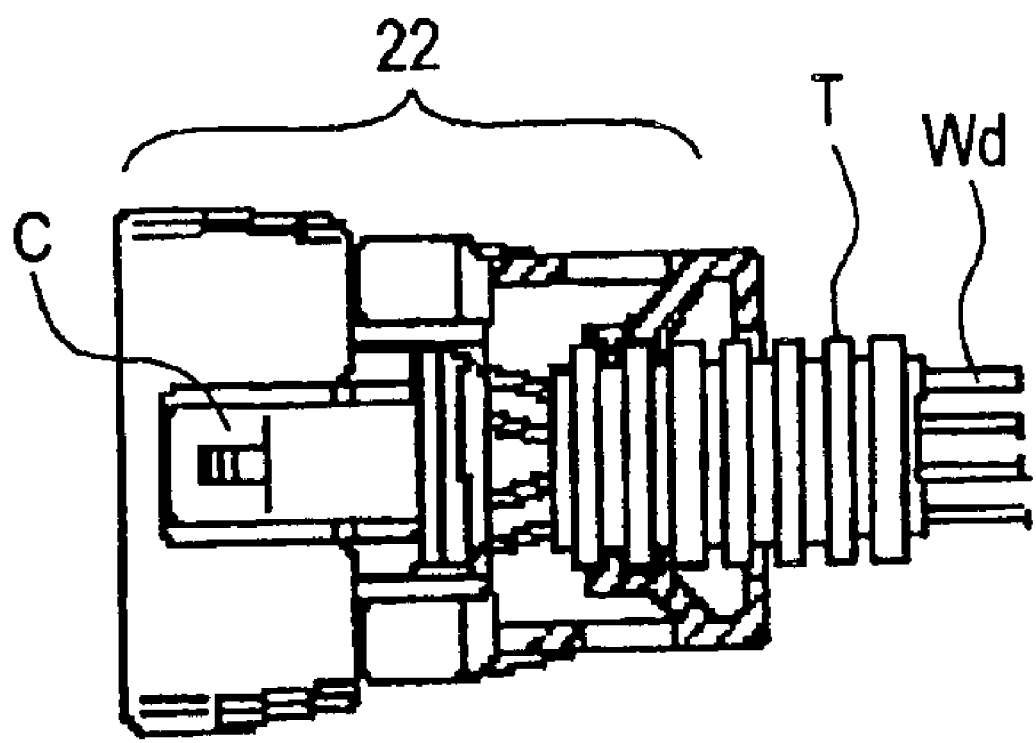
FIG. 21 is a view showing the schematic structure for restricting a displacement of a tubular cable cover T which is obtained by fixing a tubular cable cover T to a connector C using a conventionally available engaging member.

Hereinafter, a joint 10 according to a second embodiment of the present invention is explained with reference to FIGS. 16 through 18. The joint 10 explained hereinafter differs from the joint 10 of the above-mentioned first embodiment only with respect to a tubular cable cover and a configuration of the grip portion which grips an end portion of the tubular cable cover and hence, the same symbols are used to indicate the identical structures and their explanation is omitted. That is, the explanation of the second embodiment is made by focusing on points which makes the second embodiment different from the first embodiment.

As shown in the drawings, the tubular cable cover which is exteriorly mounted on the cables Wd is, different from the above-mentioned corrugated tube T, formed of a hollow hard tube Td having flat outer and inner faces. The hard tube Td is also formed by molding using a synthetic resin material such as flame-resistant polypropylene. The hard tube Td is, in the same manner as the corrugated tube T, served for protecting the cables in addition to binding and bundling of the cables and is freely bendable by bending an axis thereof.

The joint 10 of the second embodiment is formed in a hollow shape by molding using a synthetic resin material. The joint 10 is mounted on the end portion of the hard tube T by joining half-split halves 12, 13 which are connected by a hinge 11. The joint 10 before mounting is usually in a state that the half-split halves 12, 13 are opened. Each half 12, 13 respectively includes a half-split grip portion 14a, 14b and a half-split clamp portion 6a, 6b, wherein the half-split grip portions 14a, 14b are connected to each other by the hinge 11 which is extended coplanar with a separation surface.

On inner peripheries of the half-split grip portions 14a, 14b which are fitted on the end portion of the hard tube Td from the outside, grip protrusions 14c which extend in the circumferential direction are formed in a projecting manner in four rows in the axial direction and an inner diameter of ridges of the grip protrusions 14c is set smaller than an outer diameter of the hard tube Td and hence, the ridges of the grip protrusions 14c cut into an outer surface of the hard tube Td so as to grip the hard tube Td.

The half-split clamp portions 6a, 6b which are contiguously and integrally formed with the end portions of the half-split grip portions 14a, 14b have the same structure as the half-split clamp portions 6a, 6b of the above-mentioned first embodiment. Due to joining of the half-split grip portions 14a, 14b and joining of the half-split clamp portion 6a, 6b, as shown in FIG. 18, the joined half-split grip portions 14a, 14b constitute a grip portion 14 which is fitted on the end portion of the hard tube Td and, at the same time, the joined half-split clamp portions 6a, 6b constitute a clamp portion 6 which clamps the cables Wd which are exposed from the end portion of the hard tube Td.

Hereinafter, the manner of mounting the joint 10 having such a structure to the end portion of the hard tube Td will be explained. To mount the joint 10 to the end portion of the hard tube Td, one half 12 of the joint 10 which is in an opened state is set.

The end portion of the hard tube Td is placed on the grip protrusions 14c of the half-split grip portion 14a and two cables Wd which are exposed from the end portion of the hard tube Td are placed on the clamp protrusions 6c of the half-split clamp portion 6a. Then, due to the joining operations of the half-split grip portions 14a, 14b and the half-split clamp portions 6a, 6b, the end portion of the hard tube Td is gripped in the inside of the grip portion 14 such that an outer periphery thereof is covered with the grip portion 14 and, at the same time, two cables Wd which are exposed from the end portion of the hard tube Td are clamped between the clamp protrusions 6c, 6f which face each other inside the clamp portion 6 and are covered with the clamp portion 6 thus completing the mounting of the joint 10.

With the use of the joint 10 having such a structure, with respect to the hard tube Td, it is also possible to obtain the manner of operation and the advantage similar to those obtained by the above-mentioned first embodiment with respect to the corrugated tube T. Here, although modifications of the joint 10 are not shown in the drawings, the modifications similar to the modifications of the joint 1 in the first embodiment are also capable, and therefore, explanations for the modifications are omitted.

As has been described in detail, the joint for tubular cable cover includes the clamp portion having the conventionally unknown function, that is, the novel function of clamping the cables per se which are exposed from the end portion of the tubular cable cover such as the corrugated tube exteriorly mounted on the cables. Further, according to the joint for tubular cable cover, the clamp portion is integrally formed on the grip portion which grips the end portion of the tubular cable cover. Accordingly, it is possible to provide the joint for tubular cable cover which can restrict the displacement of the cables by surely fixing the tubular cable cover to the cables thus eliminating the drawbacks attributed to the conventional tape winding and can also prevent the increase of the volume of the connector attributed to the provision of the engaging member.

Here, it is needless to say that the present invention is not limited to these embodiments and can be exercised in various modes without departing from the gist of the present invention. For example, there is no limitation of the embodiments also with respect to the shape of the clamp protrusions of the clamp portion, for example. Further, although the embodiments are explained with respect to the case in which two cables are used, the number of cables is not limited to such a number. Further, the clamp portion may be constituted of a three-split body, a four-split body or a split body having no hinges.

According to the joint for tubular cable cover according to the present invention, by providing the clamp portion which clamps the cables which are exposed from the end portion of the tubular cable cover such as the corrugated tube exteriorly mounted on the cables and the grip portion which grips the end portion of the tubular cable cover, it is possible to surely fix the tubular cable cover to the cables and restrict the displacement of the tubular cable cover and, at the same time, it is possible to manufacture the miniaturized joint for tubular cable cover having the simple structure at a low cost.

Although the present invention has been shown and described with reference to specific embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A joint for a tubular cable cover comprising:
 a grip portion formed by a pair of half-split grip portions and configured to grip an end portion of the tubular cable cover exteriorly mounted on at least one cable by joining the pair of half-split grip portions;
 a clamp portion formed by a pair of half-split clamp portions and configured to clamp the at least one cable exposed from the end portion by joining the pair of half-split clamp portions; and
 at least one pair of clamp protrusions, each of the clamp protrusions of each pair being formed on an inner surface of a respective one of the half-split clamp portions, each of the clamp protrusions being located at a position opposite to a position of another of the clamp protrusions such that the clamp protrusions are configured to face each other and clamp the cable exposed from the end portion by pressing the at least one cable between the at least one pair of clamp protrusions in a radial direction.

2. The joint as claimed in claim 1, wherein the pair of half-split grip portions is connected to each other with a hinge portion.

3. The joint as claimed in claim 1, wherein the pair of half-split clamp portions is connected to each other with a hinge portion.

4. The joint as claimed in claim 1, wherein an adhesive agent is filled in the clamp portion.

5. The joint as claimed in claim 1 further comprising a resilient member disposed between the clamp portion and the cable to be clamped.

6. The joint as claimed in claim 1, wherein the at least one cable comprises a plurality of cables, and all of the cables are clamped between the clamp protrusions.

7. The joint as claimed in claim 1, wherein the grip portion and the clamp portion are integrally formed.

8. The joint as claimed in claim 1, wherein the grip portion and the clamp portion are separately formed.

9. The joint as claimed in claim 1, wherein the at least one pair of clamp protrusions comprises a plurality of pairs of clamp protrusions.

10. The joint as claimed in claim 1, wherein each half-split clamp portion has a mating face that mates with another of the half-split clamp portions, and each clamp protrusion has a height lower than the mating face of the respective one of the half-split clamp portions.

11. The joint as claimed in claim 10, wherein, when the mating faces are in contact with each other, an interval between the clamp protrusions that face each other is smaller than an outer diameter of the at least one cable.

* * * * *